(12) United States Patent
Miles

(10) Patent No.: US 10,337,566 B2
(45) Date of Patent: Jul. 2, 2019

(54) LOW LOSS DIRECT POINT WET CLUTCH FLUID WALL SYSTEM

(71) Applicant: TUBEWORKS, INC., Riverside, CA (US)

(72) Inventor: Jayson Miles, Riverside, CA (US)

(*) Notice: Subject to any disclaimer, the term of this patent is extended or adjusted under 35 U.S.C. 154(b) by 253 days.

(21) Appl. No.: 15/410,646

(22) Filed: Jan. 19, 2017

(65) Prior Publication Data

US 2017/0204915 A1 Jul. 20, 2017

Related U.S. Application Data

(60) Provisional application No. 62/280,466, filed on Jan. 19, 2016.

(51) Int. Cl.
*F16D 13/52* (2006.01)
*F16D 13/74* (2006.01)
*F16D 13/56* (2006.01)

(52) U.S. Cl.
CPC ............. *F16D 13/74* (2013.01); *F16D 13/52* (2013.01); *F16D 13/56* (2013.01); *F16D 2250/0007* (2013.01); *F16D 2250/0023* (2013.01); *F16D 2250/0084* (2013.01)

(58) Field of Classification Search
CPC .......... F16D 13/74; F16D 13/56; F16D 13/52; F16D 2250/0007; F16D 2250/0084; F16D 2250/0023
See application file for complete search history.

(56) References Cited

U.S. PATENT DOCUMENTS

| 8,997,962 | B2 | 4/2015 | Yazaki et al. |
| 9,046,139 | B2* | 6/2015 | Meyer ..................... F16D 13/72 |
| 9,091,305 | B2 | 7/2015 | Penz et al. |
| 9,528,436 | B2 | 12/2016 | Kasuya et al. |
| 9,534,639 | B2 | 1/2017 | Inayama |
| 2011/0036677 | A1* | 2/2011 | Kriebernegg ........... F16D 13/52 |
| | | | 192/70.12 |
| 2016/0169297 | A1 | 6/2016 | Phelps et al. |
| 2016/0208865 | A1 | 7/2016 | Dick et al. |
| 2016/0215830 | A1 | 7/2016 | Hattori |
| 2018/0066715 | A1* | 3/2018 | Cupit ..................... F16D 13/52 |

* cited by examiner

*Primary Examiner* — David J Hlavka
(74) *Attorney, Agent, or Firm* — Benjamin Diederich

(57) ABSTRACT

An improved multi-disc wet clutch assembly. The improvements include an inner clutch hub having eighteen holes extending through a wall of the inner clutch hub, arranged in six series of three holes with each series being disposed approximately sixty degrees apart from each other and starting at a different position along the length of the inner clutch hub wall. The improvements further include a diaphragm plate disposed within a bore at the distal end of the inner clutch hub. Methods of retrofitting preexisting clutch assemblies are also described.

19 Claims, 3 Drawing Sheets

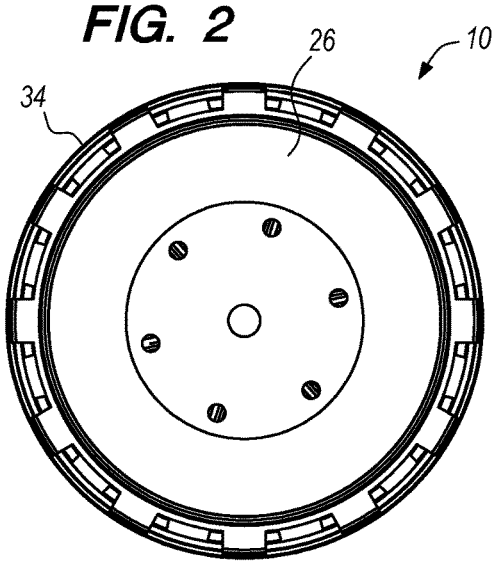
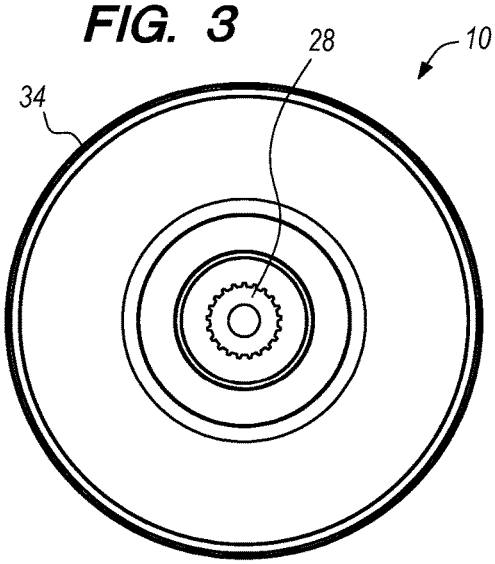
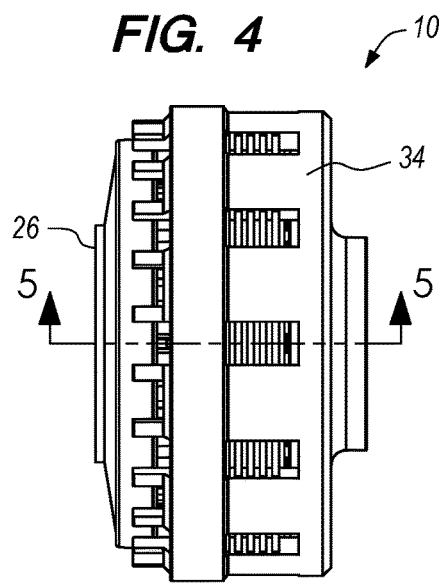
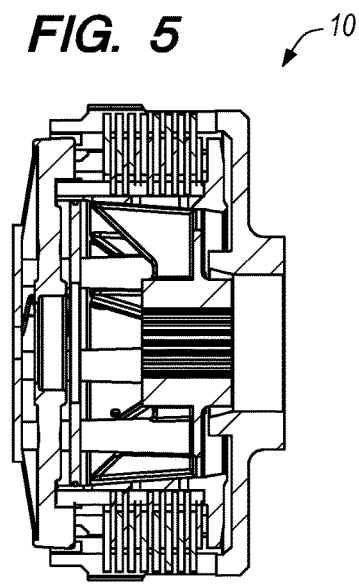

LOW LOSS DIRECT POINT WET CLUTCH FLUID WALL SYSTEM

CROSS-REFERENCE TO RELATED APPLICATIONS

This application claims the benefit of U.S. Provisional Application No. 62/280,466, filed on Jan. 19, 2016, the teachings of which are expressly incorporated by reference.

STATEMENT RE: FEDERALLY SPONSORED RESEARCH/DEVELOPMENT

Not Applicable

BACKGROUND

The present disclosure relates generally to improved clutch systems, and more particularly to clutch systems featuring a plurality of ported oiling holes in the inner hub and a control diaphragm to contain the oil.

In general, multi-disc wet clutch transmissions have a plurality of friction plates capable of engaging with one another. Transmissions that utilize a multi-disc wet clutch system typically have a limited amount of clutch allocated lubricant (oil) volume. This limited volume must be used in the most efficient and direct point placement to minimize the consumption of volume from the pump system that provides pressure and volume to the entirety of the transmission demands for gear and bearing lubrication. Typically the inner clutch hub is a forged or cast shape ported with oil from one side. This oil that is ported in, flows across inner hub and cools the inner surface profile of the clutch hub. With inadequate lubricant placement or volume, multi-disc wet clutch systems will run near dry, overheat, and cause friction material failure.

In order to overcome these problems, various solutions have been introduced. For example, some designs have fluid holes drilled through the inner hub to allow a small percentage of the oil to centrifugally pass directly into the clutch plates. In this scenario, a majority of the oil is expelled out the large opening due to the design aspect and the lofted interior surfaces created for the mold/production and part ejection process during manufacturing. In many other applications, the clutch assembly actually sits in an oil bath or is sprayed from a port or ports to the outer surface of the clutch assembly. As elevated rpm is introduced, the clutch assembly cuts through the oil creating parasitic friction loss, foaming, and lubrication is centrifugally thrown off.

As such, there is a need for a system to continuously oil and cool a wet clutch system at all engagement or modulation rpm ranges with a limited amount of lubricant volume. There is a need for such a system that allows for every friction plate to be sufficiently lubricated, while also minimizing system drag, parasitic friction loss, foaming, and other undesirable effects from the use of excess lubricant.

BRIEF SUMMARY

The present disclosure contemplates an improved clutch assembly, by either modifying an existing multi-disc wet clutch assembly, or providing the improved clutch assembly outright. In the case of modifying an existing multi-disc wet clutch assembly, the amount of work required to significantly improve existing clutch assemblies requires only a few changes made to the central clutch hub (direct ported oiling holes), along with the addition of a control diaphragm installed within the assembly.

This diaphragm system or fluid wall with an array of direct ported oiling holes through the inner clutch hub is capable of maintaining control of nearly 100% of the small volume of oil ported to the center of the clutch hub. This oil now can be directed through every friction plate and steel plate, thereby maximizing the efficiency of the small volume in cooling and lubrication of the clutch assembly. Furthermore, even as RPM is increased, the oil path is always the same, and must pass between the clutch plates. As such, it can be seen that the improved clutch assembly of the present disclosure is greatly improved over the known prior art. In accordance with one embodiment of the present disclosure, there is contemplated an improved multi-disc wet clutch assembly made up of an outer clutch basket having a plurality of friction plates contained within and operably connected to the outer clutch basket.

The assembly further includes an inner clutch hub having an outwardly extending base portion at a proximal end and a plurality of standoff posts extending outwardly from a distal end. The inner clutch hub is rotatably disposed within the outer clutch basket. Furthermore, the inner clutch hub includes eighteen holes extending through a wall of the inner clutch hub. The holes are arranged in six series of three holes along the length of the inner clutch hub wall with each series being disposed approximately sixty degrees apart from each other and each series starting at a different position along the length of the inner clutch hub wall.

The assembly further includes a plurality of clutch plates disposed around and operably connected to the inner clutch hub. The plurality of friction plates and plurality of clutch plates are alternately overlapped with each other.

The assembly further includes a pressure plate disposed along the plurality of standoff posts and sandwiching the plurality of friction plates and plurality of clutch plates with the inner clutch hub base portion. The assembly further includes a pressure plate spring abutting the pressure plate.

The assembly further includes a diaphragm plate disposed along the plurality of standoff posts and within a bore located at the distal end of the inner clutch hub. The assembly contains a diaphragm O-ring disposed between the diaphragm plate and the inner clutch hub and three diaphragm springs disposed along three stand-off posts located approximately one hundred twenty degrees apart from each other between the diaphragm plate and the pressure plate.

Another embodiment of the present disclosure envisions a method for improving a multi-disc wet clutch assembly. The assembly has an outer clutch basket and a plurality of friction plates contained within and operably connected to the outer clutch basket. The assembly further includes an inner clutch hub having an outwardly extending base portion at a proximal end and a plurality of standoff posts extending outwardly from a distal end. The inner clutch hub is rotatably disposed within the outer clutch basket. The assembly also includes a plurality of clutch plates disposed around and operably connected to the inner clutch hub. The plurality of friction plates and plurality of clutch plates alternately overlap each other. The assembly further includes a pressure plate disposed along the plurality of stand-off posts and sandwiching the plurality of friction plates and plurality of clutch plates with the inner clutch hub base portion and a pressure plate spring abutting the pressure plate.

The method includes a step of forming a concentric bore at the distal end of the inner clutch hub. The bore may be formed approximately half an inch deep. A diaphragm plate is then placed within the bore and along the plurality of standoff posts with an O-ring positioned between the diaphragm plate and the inner clutch hub. Additionally, at least one spring is positioned between the diaphragm plate and the pressure plate. In that regard, three springs may be placed between the diaphragm plate and the pressure plate. The springs may be placed along the standoff posts.

The method also includes a step of forming a plurality of holes through a wall of the inner clutch hub. In that regard, eighteen holes may be formed through the wall of the inner clutch hub. Further, the holes may be arranged in six series of three holes along the length of the inner clutch hub wall. Additionally, each series of holes may be formed approximately sixty degrees apart from each other. Also, each series of holes may be formed such that each series starts at a different position along the length of the inner clutch hub wall.

The method may be used with forged or cast inner clutch hubs.

Yet another embodiment of the present disclosure envisions an improved multi-disc wet clutch assembly having an outer clutch basket and a plurality of friction plates contained within and operably connected to the outer clutch basket.

This assembly also includes an inner clutch hub having an outwardly extending base portion at a proximal end and a plurality of standoff posts extending outwardly from a distal end. The inner clutch hub is rotatably disposed within the outer clutch basket and includes a plurality of holes extending through a wall of the inner clutch hub.

Further, this assembly includes a plurality of clutch plates disposed around and operably connected to the inner clutch hub, such that the plurality of friction plates and plurality of clutch plates are alternately overlapped with each other.

This assembly also includes a pressure plate disposed along the plurality of stand-off posts and sandwiching the plurality of friction plates and plurality of clutch plates with the inner clutch hub base portion and a pressure plate spring abutting the pressure plate.

In addition, this assembly includes a diaphragm plate disposed along the plurality of stand-off posts and within a bore located at the distal end of the inner clutch hub with a diaphragm O-ring disposed between the diaphragm plate and the inner clutch hub. Additionally, there is at least one diaphragm spring disposed along at least one standoff post between the diaphragm plate and the pressure plate.

There may be eighteen holes extending through the wall of the inner clutch hub in this embodiment. Furthermore, the holes may be arranged in six series of three holes along the length of the inner clutch hub wall. Also, each series of holes may be disposed approximately sixty degrees apart from each other. Additionally, each series may start at a different position along the length of the inner clutch hub wall.

In this embodiment, there may be three diaphragm springs located approximately one hundred twenty degrees apart from each other and the inner clutch hub may be a forged or cast shape.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 2 is a top view of the clutch assembly shown in FIG. 1;

FIG. 3 is a bottom view of the clutch assembly shown in FIG. 1;

FIG. 4 is an assembled side view of the clutch assembly shown in FIG. 1;

FIG. 5 is a cross-sectional view of the clutch assembly shown in FIG. 4 along line 5-5.

DETAILED DESCRIPTION

Figure 1:
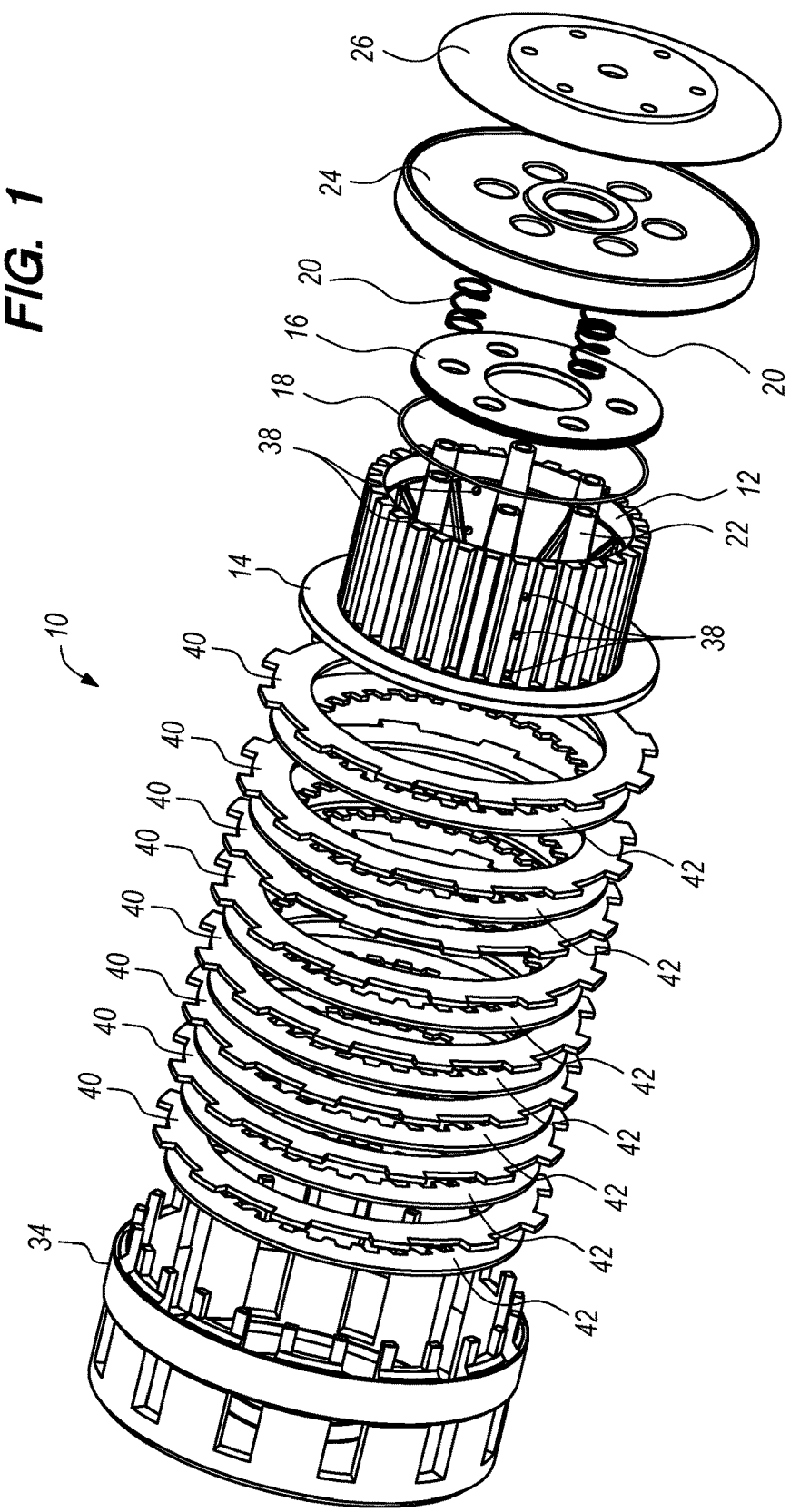
FIG. 1 is an exploded side view of a clutch assembly of the present disclosure.

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

As shown in the Figures, there is an improved multi-disc wet clutch assembly 10. This improved assembly 10 may be formed during its initial manufacture, or alternatively may be formed by modifying a preexisting clutch assembly. An example of the modification of a preexisting clutch assembly is described below.

Assembly of the Invention

In order to outfit the existing clutch used in this assembly 10 from the 2016 Yamaha YXZ 1000R a concentric bore 12 was cut inside the central clutch hub 14 approximately half an inch deep to allow the diaphragm plate 16 and the O-ring 18 that goes around it to be slid into the central clutch hub 14. The existing central clutch hub 14 appears to be a net forged unit or cast unit having an amount of loft on the interior profile. This existing loft is for release from the mold tooling in its manufacturing process. This loft in the first half-inch section was removed to provide reliable sealing of the diaphragm plate 16 and a mechanical stop point to control its location of depth in the clutch hub 14.

In this application, three low-pressure compression springs 20 were used in an even orientation of one hundred twenty degrees of separation, over the total three hundred sixty degrees. The springs 20 slide over the existing pressure plate standoff posts 22 made into the central clutch hub 14. The springs 20 rest against the outer surface of the newly installed diaphragm plate 16 and pass through the existing pressure plate 24 with no modifications. The outside face of these three diaphragm retaining springs 20 are now retained by the interior surface of the unmodified pressure plate spring 26.

The unmodified pressure plate spring 26 is now bolted down to the central clutch hub 14 providing the original installation orientation and elevation. The use of the three springs 20 allows the original pressure plate 24 to be modulated in its entirety with the original clutch clamp pressure and continuously applies the small amount of force to retain the diaphragm plate's location and sealing.

In this application the clutch 10 is oiled from the input shaft 28 that couples to the central clutch hub 14. The shaft 28 is drilled and oil passes through its centerline 30, in which it is plugged at the end of the shaft by the throwout bearing pin (not shown). This shaft 28 is cross drilled to provide pressurized oil lubrication provided from the transmissions oil pump to the thrust sealing bushing and roller bearing 32.

This allows for the rotational difference between the outer clutch basket 34 and the central clutch hub 14.

The expelled waste oil from this roller bearing 32 is directed out of the bearing 32 into a recessed pocket 36 made in the central clutch hub 14. There is a negative taper machined into the central clutch hub pocket 36 that traps the expelled oil via centrifugal force. There is a series of six ports that are tangent to the large inner diameter of this negative taper in which the directed oil captured is forced through from the centrifugal force. This area in which the oil has passed through is now in the "new near sealed" interior cavity of the central clutch hub 14, minus the newly drilled ports listed next.

An array of eighteen holes 38 were drilled through the minor diameter of the drive splines for the clutch plates 42 on the central clutch hub 14. This array for this particular central clutch hub 14 is sixty degrees apart and directly inline with each of the fluid ports listed above and is not critical on the exact orientation or count. There are three equally spaced holes 38 per the array used, with a different starting point from the front face of the central clutch hub 14 to provide an even distribution of oil and centrifugal head pressure across the depth of the multi-disc clutch pack 40, 42.

Before the modification to the inner clutch hub 14 and installation of the diaphragm plate 16, there was only one 0.120 hole 44 through the central clutch hub 14 to the minor diameter of the drive splines for the clutch plates 42. This hole 44 was used in this application for retention of a wire retaining ring to retain some of the inner clutch plates 42, friction plates 40, and some clutch disc separation springs (jitter springs). The flow path of the oil that entered this cavity follows the loft profile to the large opening in which the oil would be expelled out, only contacting the last couple clutch plates 42 adjacent to the pressure plate 24. This system could not develop any form of head pressure to force oil through the single 0.120 hole 44 to cool and lubricate the clutch discs.

In testing, comparing the data from the unmodified clutch assembly to the modified assembly 10 there was a documented six hundred degree temperature reduction of the clutch plates over a one hundred mile cycle on the same vehicle. This reduction of temperature has a direct effect on the life and reliability of the clutch/friction plates.

Figure 6:
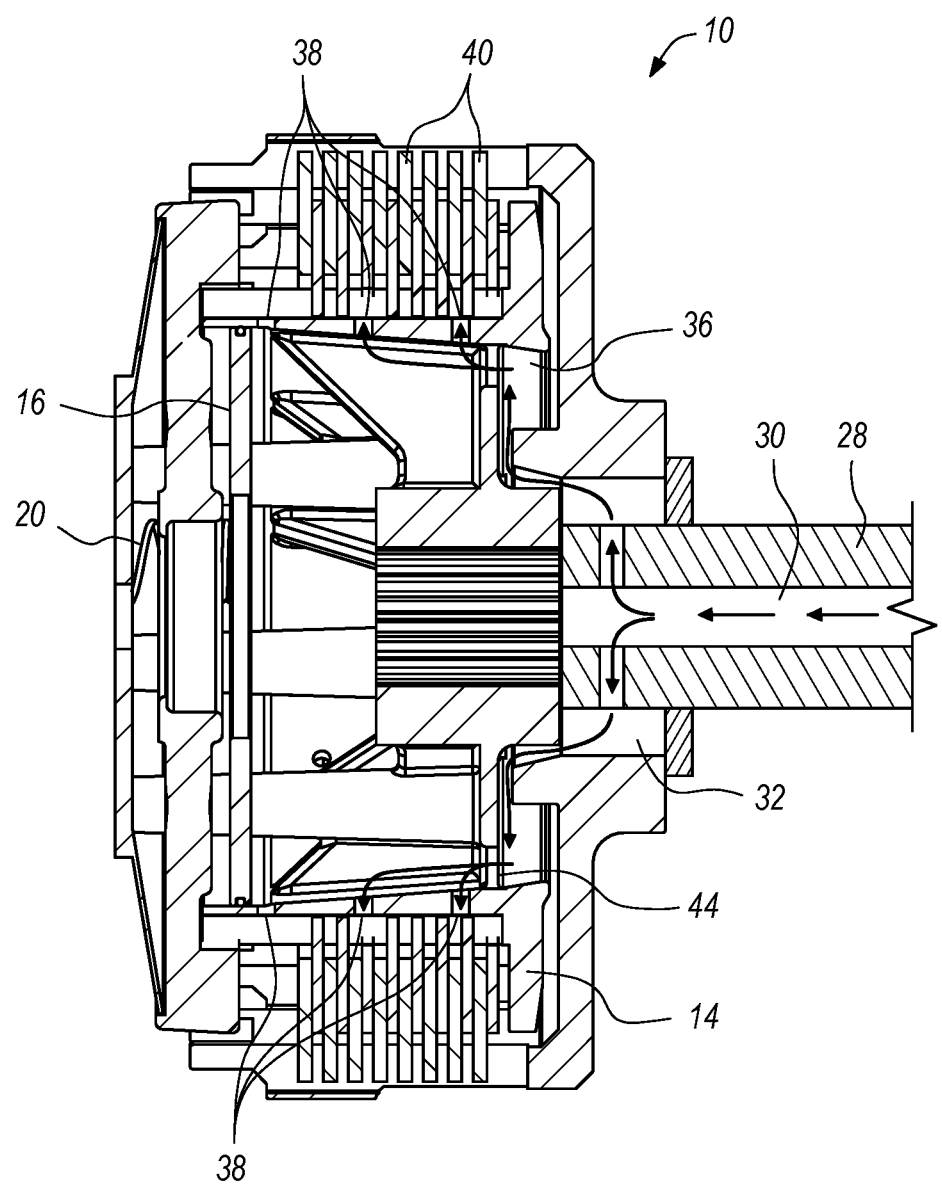
FIG. 6 is a detailed cross-sectional view of the clutch assembly shown in FIG. 5.

In the improved clutch assembly as described herein, the use of a diaphragm with an array of direct ported oiling holes through the inner clutch hub now maintains control of nearly 100% of the small volume of oil ported to the center of the clutch hub. This oil flow can be seen by way of the arrows illustrated in FIG. 6. The diaphragm oil control plate 16 that is installed into the central clutch hub 14 is pressed in and O-ring sealed. It is held in position with small springs 20 placed between the diaphragm plate 16 and pressure plate 24. The diaphragm plate, fluid wall, or even a sealed chamber (minus the array ports to the clutch disks) can be pressurized or rely on centrifugal force from the incoming fluid from the clutch shaft.

Instead of modifying a preexisting clutch assembly to achieve this result, the design can be incorporated as an integral component in a net cast unit. This may also be retained by means of a bolted, press fit, threaded, snap ring or C-clip type attachment. The cavity created between the back wall of the inner clutch hub 14 and the diaphragm plate 16 can be filled to the elevation of the pressure plate standoff posts before any fluid can escape through any other path than the holes 38 through the clutch hub 14 to the discs 40, 42. Rotation of the clutch assembly 10, which is proportional to the engine or power source, causes centrifugal force inducing applied pressure to the drilled holes 38 in the clutch hub. 14 This again forces lubrication to the clutch and friction discs 40, 42 along this oil path, which remains a constant, and must pass between the clutch and frictions plates 40, 42.

As can be seen, this improved system provides many benefits over the prior art including, but not limited to:

(1) Solving a need for accurate placement of a limited volume of oil for wet clutch units.

(2) Very little modification or cost is needed to retrofit existing assemblies.

(3) Providing continuous and reliable lubrication and cooling to multi-disc wet clutch units at any RPM, clutch position modulation, or load demand.

(4) Capturing fluid and using centrifugal force as a means to pressurize lubricant through clutch plates and friction plates.

(5) The design can be adapted to multiple clutch designs of single and multi-disc wet clutch systems.

(6) It eliminates the need for a wet clutch to function in an oil bath or use an external spray system.

(7) It eliminates parasitic loss from oil splash and foaming and adds a fluid shearing factor promoting rotational transfer between the clutch plates and friction plates.

(8) It allows a clutch unit to be located well above the oil level of a transmission, or the oil level can be reduced in dry sump application transmissions.

The above description is given by way of example, and not limitation. Given the above disclosure, one skilled in the art could devise variations that are within the scope and spirit of the invention disclosed herein, including using the improvements described in various types of clutch assemblies. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An improved multi-disc wet clutch assembly comprising:
    an outer clutch basket;
    a plurality of friction plates contained within and operably connected to the outer clutch basket;
    an inner clutch hub having an outwardly extending base portion at a proximal end and a plurality of stand-off posts extending outwardly from a distal end, the inner clutch hub rotatably disposed within the outer clutch basket, wherein the inner clutch hub includes eighteen holes extending through a wall of the inner clutch hub, the holes arranged in six series of three holes along the length of the inner clutch hub wall with each series being disposed approximately sixty degrees apart from each other and each series starting at a different position along the length of the inner clutch hub wall;
    a plurality of clutch plates disposed around and operably connected to the inner clutch hub, wherein the plurality of friction plates and plurality of clutch plates are interleaved with each other;
    a pressure plate disposed along the plurality of standoff posts and sandwiching the plurality of friction plates and plurality of clutch plates with the inner clutch hub base portion;
    a pressure plate spring abutting the pressure plate;
    a diaphragm plate disposed along the plurality of standoff posts and within a bore located at the distal end of the inner clutch hub;

a diaphragm O-ring disposed between the diaphragm plate and the inner clutch hub; and three diaphragm springs disposed along three of the plurality of standoff posts located approximately one hundred twenty degrees apart from each other and between the diaphragm plate and the pressure plate.

2. A method for improving a multi-disc wet clutch assembly, said assembly comprising:

an outer clutch basket;

a plurality of friction plates contained within and operably connected to the outer clutch basket;

an inner clutch hub having an outwardly extending base portion at a proximal end and a plurality of standoff posts extending outwardly from a distal end, the inner clutch hub rotatably disposed within the outer clutch basket;

a plurality of clutch plates disposed around and operably connected to the inner clutch hub, wherein the plurality of friction plates and plurality of clutch plates are interleaved with each other;

a pressure plate disposed along the plurality of stand-off posts and sandwiching the plurality of friction plates and plurality of clutch plates with the inner clutch hub base portion; and a pressure plate spring abutting the pressure plate;

the method comprising:

(a) forming a concentric bore at the distal end of the inner clutch hub;

(b) placing a diaphragm plate within the bore and along the plurality of stand-off posts;

(c) placing an O-ring between the diaphragm plate and the inner clutch hub;

(d) placing at least one spring between the diaphragm plate and the pressure plate; and (e) forming a plurality of holes through a wall of the inner clutch hub.

3. The method of claim 2, wherein the bore is approximately half an inch deep.

4. The method of claim 2, wherein three springs are placed between the diaphragm plate and the pressure plate in step (d).

5. The method of claim 4, wherein, in step (d), the springs are placed along three of the plurality of the standoff posts.

6. The method of claim 2, wherein eighteen holes are formed through the wall of the inner clutch hub in step (e).

7. The method of claim 6, wherein the holes are arranged in six series of three holes along the length of the inner clutch hub wall in step (e).

8. The method of claim 7, wherein each series of holes is formed approximately sixty degrees apart from each other in step (e).

9. The method of claim 8, wherein each series of holes is formed that each series starts at a different position along the length of the inner clutch hub wall in step (e).

10. The method of claim 2, wherein the inner clutch hub is a forged shape.

11. The method of claim 2, wherein the inner clutch hub is a cast shape.

12. An improved multi-disc wet clutch assembly comprising:

an outer clutch basket;

a plurality of friction plates contained within and operably connected to the outer clutch basket;

an inner clutch hub having an outwardly extending base portion at a proximal end and a plurality of stand-off posts extending outwardly from a distal end, the inner clutch hub rotatably disposed within the outer clutch basket, wherein the inner clutch hub includes a plurality of holes extending through a wall of the inner clutch hub;

a plurality of clutch plates disposed around and operably connected to the inner clutch hub, wherein the plurality of friction plates and plurality of clutch plates are interleaved with each other;

a pressure plate disposed along the plurality of standoff posts and sandwiching the plurality of friction plates and plurality of clutch plates with the inner clutch hub base portion;

a pressure plate spring abutting the pressure plate;

a diaphragm plate disposed along the plurality of standoff posts and within a bore located at the distal end of the inner clutch hub;

a diaphragm O-ring disposed between the diaphragm plate and the inner clutch hub; and at least one diaphragm spring disposed along at least one standoff post between the diaphragm plate and the pressure plate.

13. The improved assembly of claim 12, wherein there are eighteen holes extending through the wall of the inner clutch hub.

14. The improved assembly of claim 13, wherein the holes are arranged in six series of three holes along the length of the inner clutch hub wall.

15. The improved assembly of claim 14, wherein each series of holes is disposed approximately sixty degrees apart from each other.

16. The improved assembly of claim 15, wherein each series starts at a different position along the length of the inner clutch hub wall.

17. The improved assembly of claim 12, wherein there are three diaphragm springs located approximately one hundred twenty degrees apart from each other.

18. The improved assembly of claim 12, wherein the inner clutch hub is a forged shape.

19. The improved assembly of claim 12, wherein the inner clutch hub is a cast shape.

* * * * *